United States Patent
Dawkins et al.

(10) Patent No.: US 6,981,079 B2
(45) Date of Patent: Dec. 27, 2005

(54) CRITICAL DATAPATH ERROR HANDLING IN A MULTIPROCESSOR ARCHITECTURE

(75) Inventors: George John Dawkins, Austin, TX (US); Ashwini Kulkarni, Austin, TX (US); Van Hoa Lee, Cedar Park, TX (US); Gordon D. McIntosh, Austin, TX (US); Kanisha Patel, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/105,125

(22) Filed: Mar. 21, 2002

(65) Prior Publication Data

US 2003/0182351 A1    Sep. 25, 2003

(51) Int. Cl.[7] .............................................. G06F 13/00
(52) U.S. Cl. .................. 710/100; 710/48; 710/242; 710/260; 710/311; 711/163; 712/244; 714/11
(58) Field of Search ................ 719/318; 710/48, 710/260, 242, 100, 311; 714/11; 709/310; 712/244; 711/163

(56) References Cited

U.S. PATENT DOCUMENTS

| | | | |
|---|---|---|---|
| 4,371,930 A | 2/1983 | Kim ........................... 364/200 |
| 4,535,455 A | 8/1985 | Peterson ...................... 371/13 |
| 4,604,751 A | 8/1986 | Aichelmann, Jr. et al. ..... 371/38 |
| 4,920,485 A * | 4/1990 | Vahidsafa .................... 710/242 |
| 5,072,450 A | 12/1991 | Helm et al. ................. 371/21.6 |
| 5,245,615 A | 9/1993 | Treu .......................... 371/16.5 |
| 5,263,032 A | 11/1993 | Porter et al. ................ 371/40.2 |
| 5,488,731 A | 1/1996 | Mendelsohn ................ 395/800 |
| 5,504,859 A | 4/1996 | Gustafson et al. ..... 395/182.09 |
| 5,548,730 A * | 8/1996 | Young et al. ................ 710/100 |
| 5,729,767 A | 3/1998 | Jones et al. .................. 395/882 |
| 5,761,458 A * | 6/1998 | Young et al. ............... 710/311 |
| 5,889,933 A | 3/1999 | Smith ....................... 395/182.2 |
| 5,911,084 A | 6/1999 | Jones et al. .................. 395/882 |
| 5,951,669 A * | 9/1999 | Bailey et al. ............... 710/260 |
| 6,061,788 A | 5/2000 | Reynaud et al. ............... 713/2 |
| 6,158,025 A | 12/2000 | Brisse et al. ................... 714/48 |
| 6,317,848 B1 | 11/2001 | Sorens et al. ................. 714/48 |
| 6,356,963 B1 * | 3/2002 | Maguire et al. .............. 710/48 |
| 6,587,961 B1 * | 7/2003 | Garnett et al. ................ 714/11 |
| 6,823,448 B2 * | 11/2004 | Roth et al. .................... 712/244 |
| 2002/0144004 A1 * | 10/2002 | Gaur et al. ................... 709/310 |
| 2003/0005245 A1 * | 1/2003 | Catherwood ................ 711/163 |
| 2003/0051190 A1 * | 3/2003 | Marisetty et al. ............. 714/11 |

FOREIGN PATENT DOCUMENTS

| | | | | |
|---|---|---|---|---|
| JP | 57055454 A | 4/1982 | ........... G06F 11/00 |
| JP | 8137764 A | 5/1996 | ........... G06F 12/16 |

OTHER PUBLICATIONS

Reinhardt et al., "Transient Fault Detection via Simultaneous Multithreading", ISCA 00 Vancouver, British Columbia Canada, Copyright (c) 2000 ACM 1-58113-287-5/00/06-25, pp. 25-36.

* cited by examiner

*Primary Examiner*—Meng-Al T. An
*Assistant Examiner*—Jennifer N. To
(74) *Attorney, Agent, or Firm*—Duke W. Yee; Mark E. McBurney; Gerald H. Glanzman

(57) ABSTRACT

A interrupt is generated for all processors in a multiprocessor system when a critical datapath experiences an error. Serialization code in the interrupt handling routine for that interrupt suspends all processors except one and places the suspended processors in a waiting queue while the one processor handles the error. After the error has been handled, the remaining processors are allow to execute the interrupt handler, which simply exits detecting no error.

19 Claims, 3 Drawing Sheets

100 DATA PROCESSING SYSTEM

```
500
502─FLAG DS.B 1                  ; FLAG LOCATION IN MEMORY

SPIN TAS FLAG              ; TEST AND SET FLAG
504─      BMI SPIN                ; IF FLAG WAS ALREADY SET, LOOP BACK TO SPIN

507─ ; SERIALIZED CODE GOES HERE

508─ CLR.B FLAG                   ; GIVE UP CONTROL OF PROTECTED CODE
510─ RTE                          ; RETURN FROM INTERRUPT
```

CRITICAL DATAPATH ERROR HANDLING IN A MULTIPROCESSOR ARCHITECTURE

BACKGROUND OF THE INVENTION

1. Technical Field

The present invention relates generally to an improved data processing system, and in particular, to a method and apparatus for handling errors in a data processing system. Still more particularly, the present invention provides a method and apparatus for handling errors in a multiprocessor computer system, and in particular a logically-partitioned computer system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are shared among various partitions in a mutually-exclusive fashion. That is, a single resource may be allocated to one partition at any one time, but any given resources may allocated to any one of the partitions. This results in each partition behaving as if it were a stand-alone computer. Among the resources that may be shared are input/output (I/O) adapters, random-access memory (RAM), non-volatile random access memory (NVRAM), and hard disk drives, although this list is by no means exhaustive. Each partition within the LPAR system may be booted and shut down over and over without having to cycle the power to the whole system.

Groups of I/O devices may be controlled by a common piece of hardware, such as a host Peripheral Component Interface (PCI) bridge, which may have many I/O adapters controlled or below the bridge. This bridge may be thought of as being shared by all of the partitions that are assigned its slots. Hence, if the bridge becomes inoperable, it affects all of the partitions that share the devices that are below the bridge. Indeed, the problem may be so severe that the whole LPAR system will crash if any partition attempts to further use the bridge. In other words, the entire LPAR system will fail. The normal course of action in this circumstance is to terminate the running partitions that share the bridge. This will keep the system from crashing due to this failure.

What usually occurs is an I/O adapter failure that causes the bridge to assume a non-usable (error) state. At the time of occurrence, the I/O failure invokes a machine check interrupt handler (MCIH), which, in turn, will report the error and then terminate the appropriate partitions. This process is a "normal" solution that prevents the whole LPAR system from crashing due to this problem.

Certain resources in an LPAR system, however, may be shared among all of the partitions. For instance, some LPAR systems include an area of "scratchpad" memory that is shared among all partitions. If a bus failure or adapter failure occurs on the bus to which the scratchpad is connected, the whole system will be brought down, since the affected scratchpad area is shared among all of the partitions. Thus, it would be desirable if there were a way to address a fault on such a critical datapath without bringing the entire system down.

SUMMARY OF THE INVENTION

The present invention provides a method, apparatus, and computer instructions for handling an error on a critical datapath in a logically partitioned data processing system. When an error occurs, an interrupt is generated, which is processed by all processors through the execution of a machine check interrupt handler (MCIH). The MCIH contains serialization code that allows only one processor to execute the error handling portion of the MCIH at any one time; each processor (with the exception of one) is suspended and placed in a waiting queue. The one processor that was not suspended waits until all of the other processors are waiting in the queue. Once this has happened, the one processor handles the error. If the error can be corrected, the one processor sets the datapath to a no-error state and allows the remaining processors in the queue to continue execution. When the remaining processor recognize the no-error state, they return directly from the interrupt to their normal processing state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
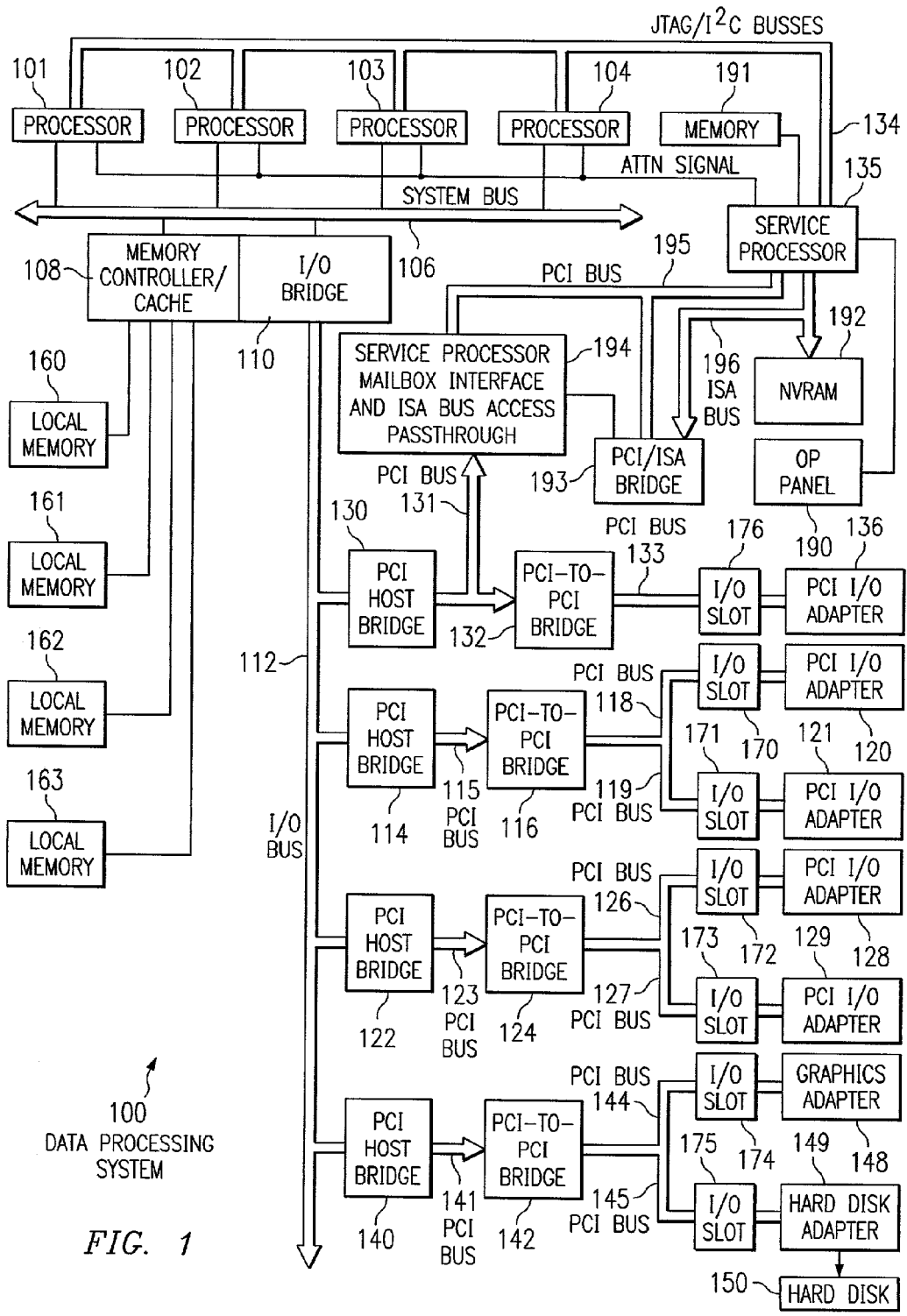
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and PCI I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface between PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and host bridge 140. Hard disk adapter 149 may be placed into I/O slot 175, which is connected to PCI bus 145. In turn, this bus is connected to PCI-to-PCI bridge 142, which is connected to PCI Host Bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/scan I²C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into host memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
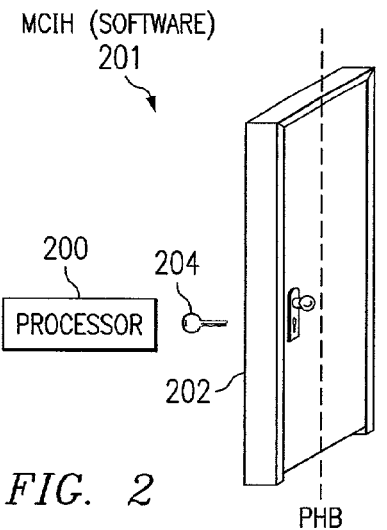
FIG. 2 is a cartoon representation of a processor executing a machine check interrupt handler to unlock a PCI host bridge locked due to an error in a data processing system according to FIG. 1.

The present invention provides a method, computer program product, and a data processing system for handling errors on a critical data path in a multi-processor data processing system. For example, in the computer system depicted in FIG. 1, NVRAM 192 is used as a scratch pad memory by all of the processors (101, 102, 103, 104). Processors 101–104 access NVRAM 192 through a datapath that includes system bus 106, I/O bridge 110, I/O bus 112, PCI host bridge 130, PCI bus 131, ISA bus access passthrough 194, PCI/ISA bridge 193, and ISA bus 196. In a typical situation, an error that occurs on PCI bus 131 will cause PCI host bridge (PHB) 130 to enter a locked state. When a device enters a locked state, it is prevented from engaging in normal operations. Thus, if any of processors 101–104 require access to PCI bus 131 or any other components associated with that bus, such as NVRAM 192, they will be denied access because PCI bridge 130 is in a locked state. Typically, this denial of access will result in an interrupt condition. An interrupt condition is a condition in which the normal processing of a processor, for instance processor 102, is interrupted and an interrupt handler is executed instead. When processor 102 is denied access by PCI host bridge 130, a machine check interrupt handler (MCIH) will typically be executed by processor 102. A machine check interrupt handler is an interrupt handler that contains code for handling an error in the hardware of a data processing system. FIG. 2 contains a cartoon representation of this error-handling scenario.

In FIG. 2, a processor 200 executing a machine check interrupt handler 201 addresses a PCI host bridge 202 in a locked state. PCI bridge 202 is depicted as a locked door. PCI bus 206, which is behind PCI bridge 202, has experienced an error condition, represented by a flag (208). As PCI host bridge 202 is in a locked state, processor 200 cannot access PCI bridge 206 to address error condition 208 without first unlocking (204) PCI host bridge 202. In a multi-processor system, however, unlocking PCI host bridge 202 can cause additional problems.

Figure 3:
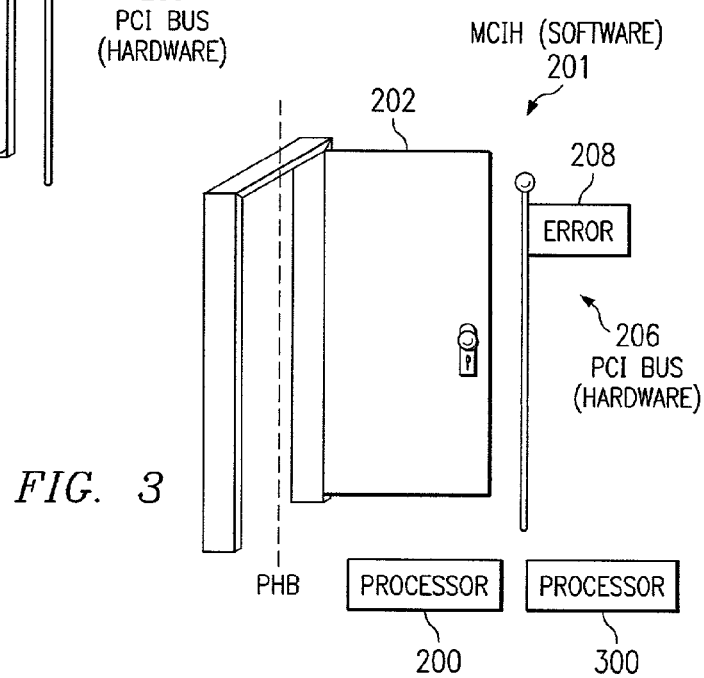
FIG. 3 is a cartoon representation of a fatal error condition caused by a second processor accessing a PCI bus experiencing an error while a first processor handles the error.

FIG. 3 is a cartoon depiction of what happens when processor 200 naively unlocks PCI host bridge 202 in a multi-processor system, such as that depicted in FIG. 1. Although processor 200 now has access to PCI bus 206 and can address error condition 208, because PCI host bridge 202 is unlocked another processor, processor 300, can also access PCI bus 206. When this happens, processor 300 will detect error condition 208. In an actual embodiment, error 208 may be detected by processor 300 in any one of a number of ways. Processor 300 may simply inspect PCI bus 206, or processor 300 may instead read an error bit stored in a component such as PCI host bridge 202.

As a general rule of computing, any error that is detected while an error is being handled, is treated as a fatal error, resulting in shut down of the entire data processing system. Thus, when processor 300 detects error condition 208 while processor 200 is attempting to handle the error, a fatal error condition it produced, and the data processing system will be terminated. When the error occurs on the data path that is frequently used by multiple processors, the normally recoverable error can easily escalate into a fatal error when multiple processors are allowed access to the error condition.

Figure 4:
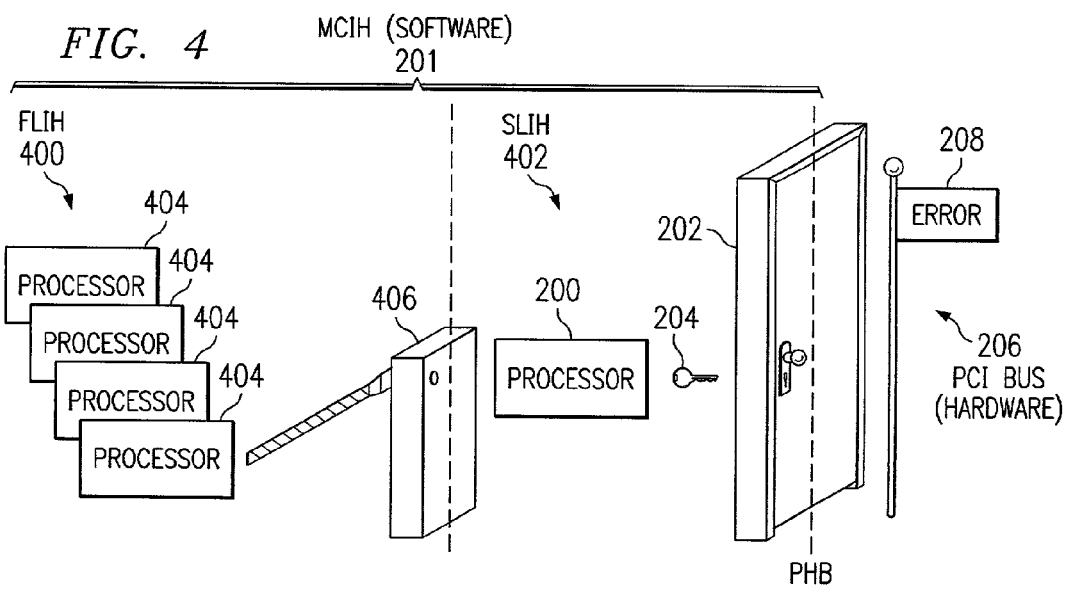
FIG. 4 is a cartoon representation of a process of serializing calls to a machine check interrupt handler in accordance with a preferred embodiment of the present invention.

The present invention ensures that only one processor is allowed to address an error at any one time. This prevents the fatal error situation depicted in FIG. 3. FIG. 4 is a cartoon representation of a process for handling an error in accordance with a preferred embodiment of the present invention. In FIG. 4, machine check interrupt handler (MCIH) 201 is divided into two components, first level interrupt handler (FLIH) 400 and second level interrupt handler (SLIH) 402. A processor that executes machine check interrupt handler 201 must first execute first level interrupt handler 400, before proceeding to execute second level interrupt handler 402. First level interrupt handler 400 contains serialization code, which is represented here as a railroad crossing arm 406.

To "serialize" multiple processes or multiple processors in a computer system, means to ensure that only one process or processor executes a particular piece of code at a time. Serialization code 406 permits only a single processor (such as processor 200) to execute second level interrupt handler 402 at one time. Thus, serialization code 406 ensures that only a single processor 200 will unlock (204) PCI host bridge 202. In a preferred embodiment of the present invention, serialization code 406 goes one step further than this, however, in that also ensures that PCI host bridge 202 will not be unlocked (204) until all other processors 404 have been placed in a suspended state so that they may not try to access PCI bus 206 while PCI host bridge 202 is unlocked and error condition 208 is still present. Thus the double-error problem depicted in FIG. 3 is avoided.

Once processor 200 has unlocked PCI host bridge 202, processor 200 will begin to address error condition 208. Depending on the type or severity of error condition 208, processor 200 may address error condition 208 at any of a number of different ways. For instances, if error condition 208 represents a recoverable error, processor 200 will correct the error. If error condition 208 represents an error that cannot be corrected, but can be avoided, processor 200 may disable whatever hardware or software is causing the problem. If error condition 208 represents a fatal error, processor 200 can initiate a safe shutdown of the system. Any number of other error handling techniques will be employed as well, without departing from the scope of spirit of the invention.

Assuming that processor 200 can correct or take other appropriate steps to keep the data processing system operational, error condition 208 will be cleared. Processor 200 will relinquish control over second level interrupt handler 402, allowing serialization code 406 to permit another of remaining processors 404 to execute second level interrupt handler 402. Observing that no error condition exists, that processor will relinquish control of second level interrupt handler 402, and so on, until all of remaining processors 404 have executed second level interrupt handler and return to normal operation.

In the process described in FIG. 4, processors 404 were placed in a suspended state by serialization code 406. When a processor is placed in a suspended state, that means that the processor is suspended from executing its normal sequence of operations. There are many ways in which this can be done in an actual embodiment of the present invention. One such method, for example, is to halt the processor at the hardware level, by asserting a "halt" signal to the processor electrically. In another method, used in a preferred embodiment, processors 404 may be placed in a spinlocked state. When a processor is in a spinlocked state, it executes code in a loop until a specified condition occurs. A spinlock mechanism may be used to ensure that only one processor is executed a given piece of code at any one time. This is generally done with the use of a lock variable. A lock variable is a variable that denotes whether a resource, such as a piece of code, is available for use or not.

Figures 5, 6:
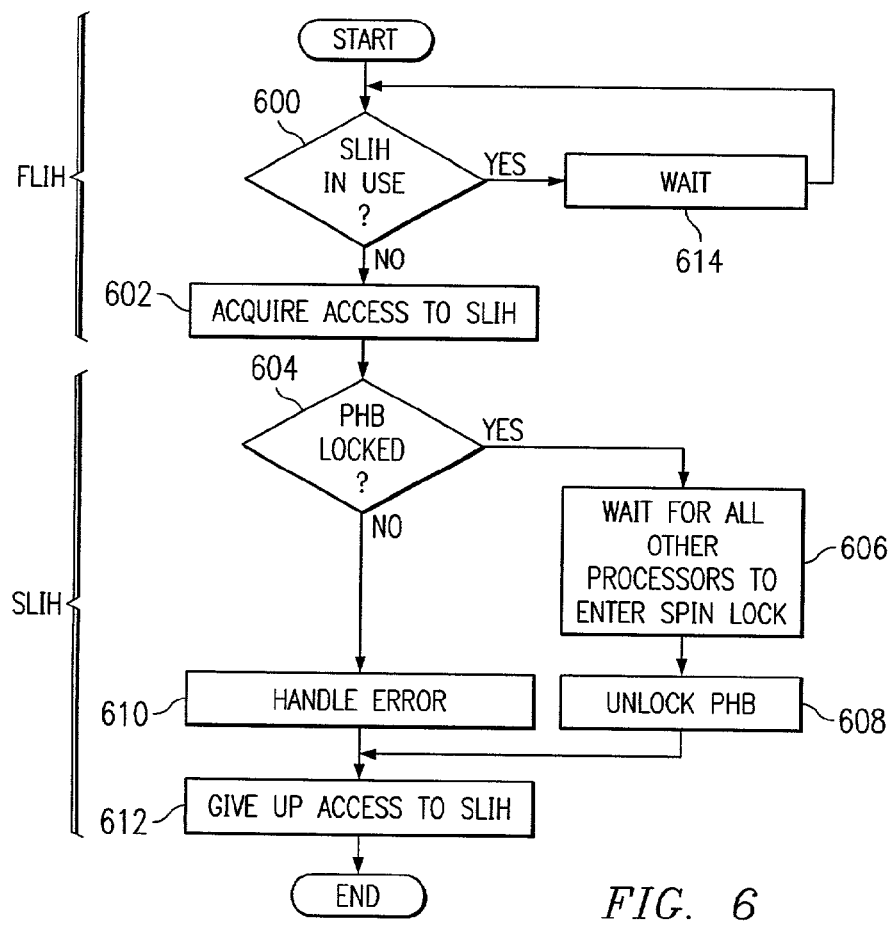
FIG. 5 is an assembly language code listing illustrating a technique for producing a spin lock in accordance with a preferred embodiment of the present invention.
FIG. 6 is a flowchart representation of a process followed by a single processor in a multiprocessor system executing a machine check interrupt handler in accordance with a preferred embodiment of the present invention.

FIG. 5 is a diagram depicting a code listing 500 written in an assembly language. Assembly code listing 500 illustrates how a spinlock mechanism may operate to serialize calls to a machine check interrupt handler in a preferred embodiment of the present invention. Those of ordinary skill in the art will appreciate that such a software implementation is not limited to the use of any particular assembly language or any assembly language at all, but may be implemented in any of a variety of computer languages, including but not limited to C, C++, Java, Fortran, Forth, Lisp, Scheme, Perl, and Prolog. It is also to be emphasized that assembly language code listing 500 is merely an example of one possible implementation of the present invention, included to clarify the basic concepts underlying the invention by providing them in a concrete form. FIG. 5 should not be interpreted as limiting the invention to a particular software implementation.

Turning now to assembly language code listing 500 itself, line 502 allocates memory for a lock variable called "FLAG." Line 504, labeled "SPIN," is a test-and-set operation on the lock variable FLAG. The test-and-set operation in line 504 simultaneously tests the lock variable flag to see if it contains a true value and sets the contents of lock variable flag to true. If the lock variable flag contains a true value then line 504 would execute it, then that means that the resource that is protected by the spin lock is currently being used. Using a test-and-set operation or other similar atomic operation prevents a second processor from attempting to modify the lock variable while the lock variable is being tested.

Line 506 is a branch instruction that causes line 504 to be re-executed if the value of lock variable FLAG was true when line 504 was last executed. If, on the other hand, lock variable FLAG contains a false value when line 504 is executed, line 506 will not cause the processor to loop back to line 504, but the serialized code following line 506, here represented by comment line 507, will be executed. Once that code has completed execution, line 508 causes the value of lock variable FLAG to be set to false, meaning the serialized code represented by comment line 507 is no longer being executed, and can be executed by another processor. Finally, line 510 is a return from interrupt instruction, which causes the processor to exit the interrupt handler being executed and return to normal operation.

FIG. 6 is a flow chart representation of a process followed by a processor (the current processor) executing a machine check interrupt handler to handle an error resulting in a locked PCI host bridge, in accordance with a preferred embodiment of the present invention. Steps 600, 602, and 614 make up a first level interrupt handler and the remaining steps make up a second level interrupt handler. Execution of the machine check interrupt handler begins with steps 600. In step 600, the determination is made as to whether the second level interrupt handler is currently being executed by another processor. If so, the current processor waits (step 614), and makes the determination again (step 600). If the second level interrupt handler is not being executed by another processor, the current processor acquires access to the second level interrupt handler (step 602). Now executing the second level interrupt handler, the current processor makes the determination as to whether the PCI host bridge is locked (step 604). If so, the current processor waits for all of the other processors to enter a spin lock state (step 606). Once that happens, the current processor unlocks the PCI host bridge (step 608). The current processor then handles the error (step 610). Finally, the current processor relinquishes its control over the second level interrupt handler (step 612).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method operative in a data processing system having a plurality of processors, the method comprising:
   serializing a plurality of procedure calls to an interrupt handler, wherein each of the plurality of procedure calls is executed by a different one of the plurality of processors;
   waiting for all of the plurality of processors except a single processor from the plurality of processors to enter a suspended state; and
   in response to all of the plurality of processors except the single processor entering the suspended state, executing a software routine that handles an error on the single processor and enabling access to a bus bridge wherein the bus bridge allows communication between the plurality of processors and a shared memory.

2. The method of claim 1, further comprising:
   in response to completion of the routine by the single processor, releasing at least one of the plurality of processors that have entered the suspended state.

3. The method of claim 1, wherein the suspended state is a spinlocked state.

4. The method of claim 1, wherein the shared memory include non-volatile random-access memory (NVRAM).

5. The method of claim 1, further comprising:
   in response to a detection of an error while the software routine is executing, disabling at least a portion of the data processing system associated with the error.

6. A computer program product in a computer-readable medium comprising:
   first functional descriptive material that, when executed by a first processor from a plurality of processors, serializes access to the resource for each of the plurality of processors, wherein access to the resource is only permitted by one processor at a time, and enables the first processor to wait until access to a resource becomes available;
   second functional descriptive material that, when executed by the first processor, enables the first processor to acquire access to the resource;
   third functional descriptive material that, when executed by the first processor, enables the first processor to service an interrupt condition and enabling access to a bus bridge wherein the bus bridge allows communication between the plurality of processors and a shared memory; and
   fourth functional descriptive material that, when executed by the first processor, enables the first processor to execute the third functional descriptive material only after all other processors from the plurality of processors have executed the first functional descriptive material.

7. The computer program product of claim 6, wherein the interrupt condition is an error condition.

8. The computer program product of claim 6, wherein access to the resource becomes available when so indicated by a lock variable.

9. The computer program product of claim 6, wherein servicing the interrupt condition includes freeing a hardware component from a frozen state.

10. The computer program product of claim 9, wherein the hardware component is the bus bridge.

11. The computer program product of claim 6, further comprising:
   fifth functional descriptive material that, when executed by the first processor, enables the first processor relinquish access to the resource.

12. The computer program product of claim 6, wherein the resource is the third functional descriptive material.

13. A data processing system, comprising:
   a plurality of processors;
   memory;
   a first-level interrupt handler within the memory;
   a second-level interrupt handler within the memory;
   means for serializing a plurality of procedure calls to the first-level interrupt handler, wherein each of the plurality of procedure calls is executed by a different one of the plurality of processors;
   means for waiting for all of the plurality of processors except a single processor from the plurality of processors to enter a suspended state; and
   means, responsive to all of the plurality of processors except the single processor entering the suspended state, for executing the second-level interrupt handler that handles an error on the single processor and enabling access to a bus bridge wherein the bus bridge allows communication between the plurality of processors and a shared memory.

14. The data processing system of claim 13, further comprising:
   means, responsive to completion of the second-level interrupt handler by the single processor, for releasing at least one of the plurality of processors that have entered the suspended state.

15. The data processing system of claim 13, wherein the suspended state is a spinlocked state.

16. The data processing system of claim 13, further comprising:
   means, responsive to a detection of an error while the second-level interrupt handler is executing, for disabling at least a portion of the data processing system associated with the error.

17. A data processing system, comprising:
   a plurality of processors, including a first processor and remaining processors;
   memory;
   serialization program code in the memory; and
   additional program code in the memory,
   wherein each of the plurality of processors executes the serialization program code that only permits one of the plurality of processors to execute the additional program code at a time,
   in response to executing the serialization program code, the first processor waits for the remaining processors to enter a suspended state,
   in response to executing the serialization program code, the remaining processors enter a suspended state, and
   in response to the remaining processors entering the suspended state, the first processor executes the additional program code that handles an error on the single processor and enabling access to a bus bridge wherein the bus bridge allows communication between the plurality of processors and a shared memory.

18. The data processing system of claim 17, further comprising:
   an interrupt-generating hardware component, wherein the interrupt-generating hardware component generates an interrupt that is transmitted to all of the plurality of processors.

19. The data processing system of claim 17, further comprising:
   a software routine that generates an interrupt that is transmitted to all of the plurality of processors.

* * * * *